United States Patent
Kim

(10) Patent No.: US 8,421,412 B2
(45) Date of Patent: Apr. 16, 2013

(54) CELL BALANCING CIRCUIT AND SECONDARY BATTERY WITH CELL BALANCING CIRCUIT

(75) Inventor: Yonguk Kim, Suwon-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 337 days.

(21) Appl. No.: 12/839,664

(22) Filed: Jul. 20, 2010

(65) Prior Publication Data

US 2011/0037433 A1 Feb. 17, 2011

(30) Foreign Application Priority Data

Aug. 11, 2009 (KR) ........................ 10-2009-0073741

(51) Int. Cl.
*H02J 7/00* (2006.01)

(52) U.S. Cl.
USPC ............................ 320/118; 320/119; 320/121

(58) Field of Classification Search .................. 320/118, 320/119
See application file for complete search history.

(56) References Cited

U.S. PATENT DOCUMENTS

| | | | | |
|---|---|---|---|---|
| 5,825,155 A | * | 10/1998 | Ito et al. | 320/118 |
| 6,081,095 A | * | 6/2000 | Tamura et al. | 320/118 |
| 7,564,217 B2 | * | 7/2009 | Tanigawa et al. | 320/118 |
| 2005/0077875 A1 | | 4/2005 | Bohley | |
| 2007/0090799 A1 | | 4/2007 | Lee et al. | |
| 2007/0285058 A1 | | 12/2007 | Kuroda | |
| 2008/0211459 A1 | | 9/2008 | Choi | |
| 2009/0243543 A1 | * | 10/2009 | Kawana et al. | 320/118 |

FOREIGN PATENT DOCUMENTS

| | | |
|---|---|---|
| DE | 10325759 A1 | 12/2004 |
| DE | 102004-038534 A1 | 3/2006 |
| JP | 2007-318950 | 12/2007 |
| JP | 2008-182809 | 8/2008 |
| JP | 2008-206396 | 9/2008 |
| KR | 10-0831160 B1 | 5/2008 |
| KR | 10-0869709 B1 | 11/2008 |
| KR | 10-0908716 B1 | 7/2009 |

OTHER PUBLICATIONS

English machine translation of Japanese publication No. JP 2008-182809 dated Aug. 7, 2008 in the name of Nakatsuji, 18 pages.

(Continued)

*Primary Examiner* — M'Baye Diao
(74) *Attorney, Agent, or Firm* — Christie, Parker & Hale, LLP

(57) ABSTRACT

A cell balancing circuit with a self-balancing function and a secondary battery with the cell balancing circuit, the cell balancing circuit includes a balancing unit provided for every two adjacent unit cells among the unit cells. The balancing unit includes a discharge unit and a voltage-dividing unit. The discharge unit sets a discharge path to discharge only the unit cell with the higher voltage among the two adjacent unit cells. The voltage-dividing unit uses the voltages of the two adjacent unit cells to provide an enable signal to the discharge unit.

17 Claims, 1 Drawing Sheet

OTHER PUBLICATIONS

English machine translation of Japanese publication No. JP 2008-206396 dated Sep. 4, 2008 in the name of Nakao et al., 17 pages.

European Search Report dated Feb. 28, 2011 for corresponding European Patent Application No. 10172465.6-2207, 6 sheets.

KIPO Notice of Allowance dated May 11, 2011, for Korean Priority Patent Application No. 10-2009-0073741, 5 pages.

Korean Patent Abstracts, Publication No. 10-2006-0109048 A, dated Oct. 19, 2006, corresponding to Korean Patent 10-0831160.

Korean Patent Abstracts, Publication No. 10-2008-0080864 A, dated Sep. 5, 2008, corresponding to Korean Patent No. 10-0908716.

Korean Patent Abstracts, Publication No. 10-2008-0083771 A, dated Sep. 19, 2008, corresponding to Korean Patent No. 10-0869709.

* cited by examiner

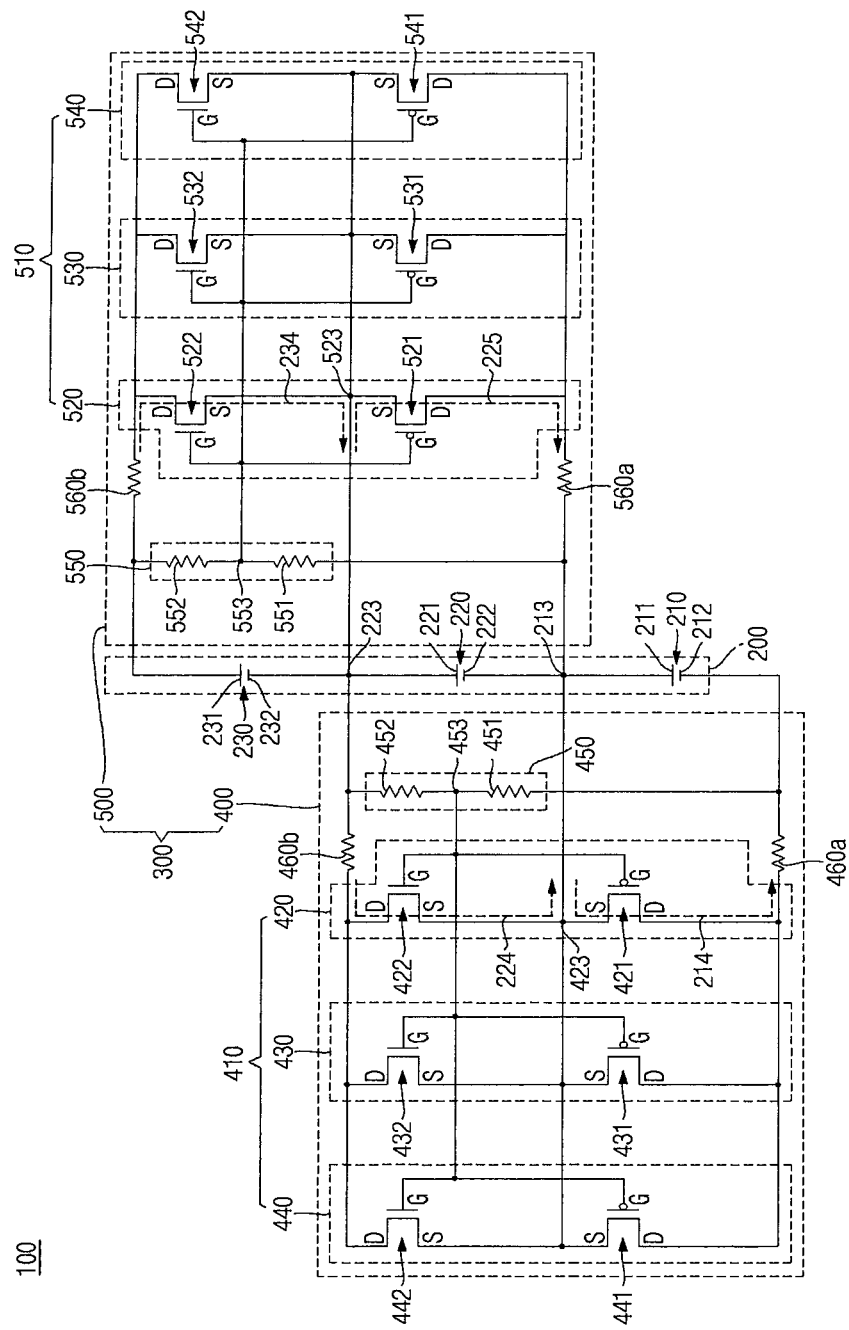

CELL BALANCING CIRCUIT AND SECONDARY BATTERY WITH CELL BALANCING CIRCUIT

CROSS-REFERENCE TO RELATED APPLICATION

This application claims priority to and the benefit of Korean Patent Application No. 10-2009-0073741, filed Aug. 11, 2009, in the Korean Intellectual Property Office, the entire content of which is incorporated herein by reference.

BACKGROUND

1. Field

Example embodiments relate to a cell balancing circuit and a secondary battery with the cell balancing circuit, and more particularly, to a cell balancing circuit with a self-balancing function and a secondary battery with the cell balancing circuit.

2. Description of the Related Art

Recently, the use of portable electronic devices is increasing with the rapid development of the electronic, communication and computer industries. Rechargeable secondary batteries are being widely used as power sources for portable electronic devices.

A secondary battery with a plurality of serially-connected unit cells is used for a high power source. Cell balancing is important when using a secondary battery with a plurality of serially-connected unit cells. The cell balancing is to maintain the voltage difference between the serially-connected unit cells to be within an allowable range. The cell balancing greatly influences the lifetime and output power of the secondary battery. If failing to be cell-balanced, the unit cell degrades, thus reducing the lifetime and output power of the secondary battery.

In a related art cell balancing method, a control IC compares the voltage of each unit cell with a reference voltage and discharges the unit cell exceeding the reference voltage, through a discharge path formed corresponding to each unit cell.

SUMMARY

Embodiments are directed to a cell balancing circuit and a secondary battery with the cell balancing circuit, which substantially overcomes one or more of the problems due to the limitations and disadvantages of the related art.

According to another embodiment of the present invention, there is provided a cell balancing circuit capable of performing a cell balancing operation even without using a control IC, and a secondary battery with the cell balancing circuit.

According to another embodiment of the present invention, there is provided a circuit for balancing a plurality of serially-connected unit cells, including: a balancing unit provided for every two adjacent unit cells among the unit cells, the balancing unit including: a discharge unit setting a discharge path to discharge only the unit cell with the higher voltage among the two adjacent unit cells; and a voltage-dividing unit using the voltages of the two adjacent unit cells to provide an enable signal to the discharge unit.

According to another embodiment of the present invention, the balancing unit may be configured to discharge only the unit cell with a voltage higher than the average voltage of the two adjacent unit cells, among the two adjacent unit cells.

According to another embodiment of the present invention, the discharge unit and the voltage-dividing unit may be connected in parallel to each other; the voltage-dividing unit may include two serially-connected resistors with the same resistance value; and the discharge unit may be connected to a node located between the two resistors of the voltage-dividing unit.

According to another embodiment of the present invention, the discharge unit of the balancing unit may include a switching unit having two switching elements connected in series to receive the enable signal of the voltage-dividing unit, and a node located between the two switching elements may be electrically connected to a node located between the two adjacent unit cells.

According to another embodiment of the present invention, one of the two switching elements may be a P-channel field effect transistor (FET), and the other may be an N-channel FET. Herein, the sources of the two switching elements may be connected to each other; the drain of the P-channel FET may be connected to the negative electrodes of the two adjacent unit cells; and the drain of the N-channel FET may be connected to the positive electrodes of the two adjacent unit cells. Also, the enable signal of the voltage-dividing unit may be transferred to the gate of the P-channel FET and the gate of the N-channel FET.

According to another embodiment of the present invention, the discharge unit may include the two or more switching units connected in parallel to each other.

According to another embodiment of the present invention, the balancing unit may further include a power-consuming resistor connected electrically to both ends of the discharge unit.

According to another embodiment of the present invention, at least one of the above and other features and advantages may be realized by providing a secondary battery with the above cell balancing circuit.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which:

FIG. 1 is a circuit diagram of a secondary battery with a cell balancing circuit according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

FIG. 1 is a circuit diagram of a secondary battery with a cell balancing circuit according to an embodiment. Referring to FIG. 1, a secondary battery 100 includes a cell module 200 and a cell balancing circuit 300.

The cell module 200 includes a first unit cell 210, a second unit cell 220 and a third unit cell 230 that are serially connected to store electrical energy and provide the same to an external device. Each of the unit cells 210, 220 and 230 may be a bare cell without a protective circuit. The first unit cell 210 has a positive electrode 211 and a negative electrode 212. The second unit cell 220 has a positive electrode 221 and a negative electrode 222 connected to the positive electrode 211 of the first unit cell 210. The third unit cell 230 has a positive electrode 231 and a negative electrode 232 connected to the positive electrode 221 of the second unit cell 220. Although it has been described in this embodiment that the cell module 200 includes three serially-connected unit cells, the inventive concept is not limited thereto. The cell module 200 may include four or more serially-connected unit cells.

The cell balancing circuit 300 includes a first balancing unit 400 and a second balancing unit 500. The cell balancing circuit 300 performs a cell balancing operation on the cell module 200. Each of the balancing units 400 and 500 is provided for every two adjacent unit cells. If the cell module 200 includes four or more N serially-connected unit cells, (N−1) balancing units are provided for every two adjacent unit cells.

The first balancing unit 400 includes a first discharge unit 410, a first voltage-dividing unit 450, a first power-consuming resistor 460a, and a second power-consuming resistor 460b. The first balancing unit 400 performs a cell balancing operation on the first unit cell 210 and the second unit cell 220.

The first discharge unit 410 includes a first switching unit 420, a second switching unit 430 and a third switching unit 440 that are connected in parallel to each other. Both ends of the first discharge unit 410 are electrically connected to the negative electrode 212 of the first unit cell 210 and the positive electrode 221 of the second unit cell 220 to establish a discharge current path.

The first switching unit 420 includes a first switching element 421 and a second switching element 422 that are connected in series to each other. A node 423 located between the first switching element 421 and the second switching element 422 is electrically connected to a node 213 located between the first unit cell 210 and the second unit cell 220, thereby forming a discharge path 214 of the first unit cell 210 and a discharge path 224 of the second unit cell 220. The discharge path 214 of the first unit cell 210 is a path from the positive electrode 211 of the first unit cell 210, through the node 213 located between the unit cells 210 and 220 and the node 423 located between the switching elements 421 and 422, to the negative electrode 212 of the first unit cell 210. The first switching element 421 is located on the discharge path 214 of the first unit cell 210. The discharge path 224 of the second unit cell 220 is a path from the positive electrode 221 of the second unit cell 220, through the node 423 located between the switching elements 421 and 422 and the node 213 located between the unit cells 210 and 220, to the negative electrode 222 of the second unit cell 220. The second switching element 422 is located on the discharge path 224 of the second unit cell 220. When there is a voltage difference between the first unit cell 210 and the second unit cell 220, the first switching unit 420 opens the discharge path of only the unit cell having the higher voltage among the unit cells 210 and 220.

The first switching element 421 may be a P-channel field effect transistor (FET) to open/close the discharge path 214 of the first unit cell 210. A source S of the first switching element 421 is electrically connected to the node 213 located between the unit cells 210 and 220. Accordingly, the voltage of the first unit cell 210 is applied to the source S of the first switching element 421. A gate G of the first switching element 421 is electrically connected to the first voltage-dividing unit 450. Accordingly, the average voltage of the unit cells 210 and 220 is applied to the gate G of the first switching element 421. A drain D of the first switching element 421 is electrically connected to the negative electrode 212 of the first unit cell 210. Since the first switching element 421 is a P-channel FET, only when the voltage of the first unit cell 210 is higher than the average voltage of the unit cells 210 and 220 (i.e., when the voltage applied to the gate G of the first switching element 421 is lower than the voltage applied to the source S of the first switching element 421), the first switching element 421 is turned on to discharge the first unit cell 210.

The second switching element 422 may be an N-channel FET to open/close the discharge path 224 of the second unit cell 220. A source S of the second switching element 422 is electrically connected to the node 213 located between the unit cells 210 and 220. Accordingly, the voltage of the first unit cell 210 is applied to the source S of the second switching element 422. A gate G of the second switching element 422 is electrically connected to the first voltage-dividing unit 450. Accordingly, the average voltage of the unit cells 210 and 220 is applied to the gate G of the second switching element 422. A drain D of the second switching element 422 is electrically connected to the positive electrode 221 of the second unit cell 220. Since the second switching element 422 is an N-channel FET, only when the voltage of the second unit cell 220 is higher than the average voltage of the unit cells 210 and 220 (i.e., when the voltage applied to the gate G of the second switching element 422 is higher than the voltage applied to the source S of the second switching element 422), the second switching element 422 is turned on to discharge the second unit cell 220.

The second switching unit 430 and the third switching unit 440 have the same configuration as the first switching unit 420, and thus a detailed description thereof will be omitted for conciseness. Although it has been described in this embodiment that the first balancing unit 400 includes three switching units 420, 430 and 440, the inventive concept is not limited thereto. The first balancing unit 400 may include one, two, or four or more switching units. As the number of switching units increases, the number of discharge current paths increases, thus increasing a balancing current to reduce a cell balancing time.

The first voltage-dividing unit 450 is electrically connected to the first unit cell 210 and the second unit cell 220, and is connected in parallel to the both ends of the first discharge unit 410. The first voltage-dividing unit 450 includes a first resistor 451 and a second resistor 452 that are serially connected and have the same resistance value. A node 453 located between the resistors 451 and 452 is electrically connected to the gate G of each of the switching elements 421, 422, 431, 432, 441 and 442 of the first discharge unit 410. Since the resistors 451 and 452 have the same resistance value, the average voltage of the first unit cell 210 and the second unit cell 220 is applied to the gate G of each of the switching elements 421, 422, 431, 432, 441 and 442 of the first discharge unit 410. The resistors 451 and 452 may have a large resistance value of about several MΩ. This is to prevent the unit cells 210 and 220 from being discharged through a connection path of the resistors 451 and 452.

The first power-consuming resistor 460a and the second power-consuming resistor 460b are electrically connected respectively to the both ends of the first discharge unit 410. The first power-consuming resistor 460a is electrically connected to the negative electrode 212 of the first unit cell 210. The first power-consuming resistor 460a serves to increase the power consumption by the discharge current of the first unit cell 210, thereby reducing a balancing time. The second power-consuming resistor 460b is electrically connected to the positive electrode 221 of the second unit cell 220. The second power-consuming resistor 460b serves to increase the power consumption by the discharge current of the second unit cell 220, thereby reducing a balancing time.

The second balancing unit 500 includes a second discharge unit 510, a second voltage-dividing unit 550, a third power-consuming resistor 560a, and a fourth power-consuming resistor 560b. The second balancing unit 500 performs a cell balancing operation on the second unit cell 220 and the third unit cell 230.

The second discharge unit 510 includes a fourth switching unit 520, a fifth switching unit 530 and a sixth switching unit 540 that are connected in parallel to each other. Both ends of the second discharge unit 510 are electrically connected to the negative electrode 222 of the second unit cell 220 and the positive electrode 231 of the third unit cell 230 to establish a discharge current path.

The fourth switching unit 520 includes a third switching element 521 and a fourth switching element 522 that are connected in series to each other. A node 523 located between the third switching element 521 and the fourth switching element 522 is electrically connected to a node 223 located between the second unit cell 220 and the third unit cell 230, thereby forming a discharge path 225 of the second unit cell 220 and a discharge path 234 of the third unit cell 230. The discharge path 225 of the second unit cell 220 is a path from the positive electrode 221 of the second unit cell 220, through the node 223 located between the unit cells 220 and 230 and the node 523 located between the switching elements 521 and 522, to the negative electrode 222 of the second unit cell 220. The third switching element 521 is located on the discharge path 225 of the second unit cell 220. The discharge path 234 of the third unit cell 230 is a path from the positive electrode 231 of the third unit cell 230, through the node 523 located between the switching elements 521 and 522 and the node 223 located between the unit cells 220 and 230, to the negative electrode 232 of the third unit cell 230. The fourth switching element 522 is located on the discharge path 234 of the third unit cell 230. When there is a voltage difference between the second unit cell 220 and the third unit cell 230, the fourth switching unit 520 opens the discharge path of only the unit cell having the higher voltage among the unit cells 220 and 230.

The third switching element 521 may be a P-channel FET to open/close the discharge path 225 of the second unit cell 220. A source S of the third switching element 521 is electrically connected to the node 223 located between the unit cells 220 and 230. Accordingly, the voltage of the second unit cell 220 is applied to the source S of the third switching element 521. A gate G of the third switching element 521 is electrically connected to the second voltage-dividing unit 550. Accordingly, the average voltage of the unit cells 220 and 230 is applied to the gate G of the third switching element 521. A drain D of the third switching element 521 is electrically connected to the negative electrode 222 of the second unit cell 220. Since the third switching element 521 is a P-channel FET, only when the voltage of the second unit cell 220 is higher than the average voltage of the unit cells 220 and 230 (i.e., when the voltage applied to the gate G of the third switching element 521 is lower than the voltage applied to the source S of the third switching element 521), the third switching element 521 is turned on to discharge the second unit cell 220.

The fourth switching element 522 may be an N-channel FET to open/close the discharge path 234 of the third unit cell 230. A source S of the fourth switching element 522 is electrically connected to the node 223 located between the unit cells 220 and 230. Accordingly, the voltage of the second unit cell 220 is applied to the source S of the fourth switching element 522. A gate G of the fourth switching element 522 is electrically connected to the second voltage-dividing unit 550. Accordingly, the average voltage of the unit cells 220 and 230 is applied to the gate G of the fourth switching element 522. A drain D of the fourth switching element 522 is electrically connected to the positive electrode 231 of the third unit cell 230. Since the fourth switching element 522 is an N-channel FET, only when the voltage of the third unit cell 230 is higher than the average voltage of the unit cells 220 and 230 (i.e., when the voltage applied to the gate G of the fourth switching element 522 is higher than the voltage applied to the source S of the fourth switching element 522), the fourth switching element 522 is turned on to discharge the third unit cell 230.

The fifth switching unit 530 and the sixth switching unit 540 have the same configuration as the fourth switching unit 520, and thus a detailed description thereof will be omitted for conciseness. Although it has been described in this embodiment that the second balancing unit 500 includes three switching units 520, 530 and 540, the inventive concept is not limited thereto. The second balancing unit 500 may include one, two, or four or more switching units. As the number of switching units increases, the number of discharge current paths increases, thus increasing a balancing current to reduce a cell balancing time.

The second voltage-dividing unit 550 is electrically connected to the second unit cell 220 and the third unit cell 230, and is connected in parallel to the both ends of the second discharge unit 510. The second voltage-dividing unit 550 includes a third resistor 551 and a fourth resistor 552 that are serially connected and have the same resistance value. A node 553 located between the resistors 551 and 552 is electrically connected to the gate G of each of the switching elements 521, 522, 531, 532, 541 and 542 of the second discharge unit 510. Since the resistors 551 and 552 have the same resistance value, the average voltage of the second unit cell 220 and the third unit cell 230 is applied to the gate G of each of the switching elements 521, 522, 531, 532, 541 and 542 of the second discharge unit 510. The resistors 551 and 552 may have a large resistance value of about several MO. This is to prevent the unit cells 220 and 230 from being discharged through a connection path of the resistors 551 and 552.

The third power-consuming resistor 560a and the fourth power-consuming resistor 560b are electrically connected respectively to both ends of the second discharge unit 510. The third power-consuming resistor 560a is electrically connected to the negative electrode 222 of the second unit cell 220. The third power-consuming resistor 560a serves to increase the power consumption by the discharge current of the second unit cell 220, thereby reducing a balancing time. The fourth power-consuming resistor 560b is electrically connected to the positive electrode 231 of the third unit cell 230. The fourth power-consuming resistor 560b serves to increase the power consumption by the discharge current of the third unit cell 230, thereby reducing a balancing time.

Hereinafter, a cell balancing process according to the above embodiment will be described in detail with reference to FIG. 1.

First, a description will be given of a cell balancing operation when the voltage V1 of the first unit cell 210 becomes higher than the voltage V2 of the second unit cell 220. The voltage V1 of the first unit cell 210 is applied to the source S of each of the switching elements 421, 422, 431, 432, 441 and 442 of the first balancing unit 400. Also, the average voltage ((V1+V2)/2) of the cells 210 and 220 is applied to the gate G of each of the switching elements 421, 422, 431, 432, 441 and 442 of the first balancing unit 400. The voltage applied to the gate G of the second switching elements 422, 432 and 442 of the first balancing unit 400 becomes lower than the voltage applied to the source S of the second switching elements 422, 432 and 442. Accordingly, the second switching elements 422, 432 and 442 of the first balancing unit 400 are turned off to interrupt the discharge of the second unit cell 220. The voltage applied to the gate G of the first switching elements 421, 431 and 441 of the first balancing unit 400 becomes lower than the voltage applied to the source S of the first switching elements 421, 431 and 441. Accordingly, the first switching elements 421, 431 and 441 of the first balancing unit 400 are turned on to discharge the first unit cell 210 until the voltage V1 of the first unit cell 210 becomes equal to the voltage V2 of the second unit cell 220. When the voltage V1 of the first unit cell 210 becomes equal to the voltage V2 of the second unit cell 220, the voltage applied to the source S of each of the switching elements 421, 422, 431, 432, 441 and 442 of the first balancing unit 400 becomes equal to the voltage applied to the gate G of each of the switching elements 421, 422, 431, 432, 441 and 442. Accordingly, the switching elements 421, 422, 431, 432, 441 and 442 are all turned off to interrupt the cell balancing operation in the first balancing unit 400.

A description will now be given of a cell balancing operation when the voltage V1 of the first unit cell 210 becomes lower than the voltage V2 of the second unit cell 220. In this case, the voltage applied to the gate G of the first switching elements 421, 431 and 441 of the first balancing unit 400 becomes higher than the voltage applied to the source S of the first switching elements 421, 431 and 441. Accordingly, the first switching elements 421, 431 and 441 of the first balancing unit 400 are turned off to interrupt the discharge of the first unit cell 210. The voltage applied to the gate G of the second switching elements 422, 432 and 442 of The first balancing unit 400 becomes higher than the voltage applied to the source S of the second switching elements 422, 432 and 442. Accordingly, the second switching elements 422, 432 and 442 of the first balancing unit 400 are turned on to discharge the second unit cell 220 until the voltage V2 of the second unit cell 220 becomes equal to the voltage V1 of the first unit cell 210. When the voltage V2 of the second unit cell 220 becomes equal to the voltage V1 of the first unit cell 210, the voltage applied to the source S of each of the switching elements 421, 422, 431, 432, 441 and 442 of the first balancing unit 400 becomes equal to the voltage applied to the gate G of each of the switching elements 421, 422, 431, 432, 441 and 442. Accordingly, the switching elements 421, 422, 431, 432, 441 and 442 are all turned off to interrupt the cell balancing operation in the first balancing unit 400.

Through the above process, the voltage V1 of the first unit cell 210 becomes equal to the voltage V2 of the second unit cell 220. Hereinafter, a description will be given of a cell balancing operation between the second unit cell 220 and the third unit cell 230.

First, a description will be given of a cell balancing operation when the voltage V2 of the second unit cell 220 becomes higher than the voltage V3 of the third unit cell 230. The voltage V2 of the second unit cell 220 is applied to the source S of each of the switching elements 521, 522, 531, 532, 541 and 542 of the second balancing unit 500. Also, the average voltage ((V1+V2)/2) of the cells 220 and 230 is applied to the gate G of each of the switching elements 521, 522, 531, 532, 541 and 542 of the second balancing unit 500. The voltage applied to the gate G of the fourth switching elements 522, 532 and 542 of the second balancing unit 500 becomes lower than the voltage applied to the source S of the fourth switching elements 522, 532 and 542. Accordingly, the fourth switching elements 522, 532 and 542 of the second balancing unit 500 are turned off to interrupt the discharge of the third unit cell 230. The voltage applied to the gate G of the third switching elements 521, 531 and 541 of the second balancing unit 500 becomes lower than the voltage applied to the source S of the third switching elements 521, 531 and 541. Accordingly, the third switching elements 521, 531 and 541 of the second balancing unit 500 are turned on to discharge the second unit cell 220 until the voltage V2 of the second unit cell 220 becomes equal to the voltage V3 of the third unit cell 230. When the voltage V2 of the second unit cell 220 becomes equal to the voltage V3 of the third unit cell 230, the voltage applied to the source S of each of the switching elements 521, 522, 531, 532, 541 and 542 of the second balancing unit 500 becomes equal to the voltage applied to the gate G of each of the switching elements 521, 522, 531, 532, 541 and 542. Accordingly, the switching elements 521, 522, 531, 532, 541 and 542 are all turned off to interrupt the cell balancing operation in the second balancing unit 500.

A description will now be given of a cell balancing operation when the voltage V2 of the second unit cell 220 becomes lower than the voltage V3 of the third unit cell 230. In this case, the voltage applied to the gate G of the third switching elements 521, 531 and 541 of the second balancing unit 500 becomes higher than the voltage applied to the source S of the third switching elements 521, 531 and 541. Accordingly, the third switching elements 521, 531 and 541 of the second balancing unit 500 are turned off to interrupt the discharge of the second unit cell 220. The voltage applied to the gate G of the fourth switching elements 522, 532 and 542 of the second balancing unit 500 becomes higher than the voltage applied to the source S of the fourth switching elements 522, 532 and 542. Accordingly, the fourth switching elements 522, 532 and 542 of the second balancing unit 500 are turned on to discharge the third unit cell 230 until the voltage V3 of the third unit cell 230 becomes equal to the voltage V2 of the second unit cell 220. When the voltage V3 of the third unit cell 230 becomes equal to the voltage V2 of the second unit cell 220, the voltage applied to the source S of each of the switching elements 521, 522, 531, 532, 541 and 542 of the second balancing unit 500 becomes equal to the voltage applied to the gate G of each of the switching elements 521, 522, 531, 532, 541 and 542. Accordingly, the switching elements 521, 522, 531, 532, 541 and 542 are all turned off to interrupt the cell balancing operation in the second balancing unit 500.

The above cell balancing operation in each of the balancing units 400 and 500 repeats until the voltages V1, V2 and V3 of the unit cells 210, 220 and 230 become equal to each other. Although the cell balancing operation on three serially-connected unit cells 210, 220 and 230 has been described in the above embodiment, those skilled in the art will understand that a cell balancing operation on four or more serially-connected unit cells may be performed in the same manner, which is also included in the scope of the inventive concept.

According to the embodiments described above, cell balancing is possible even without using a control IC, thus making it possible to reduce the fabrication cost of a secondary battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A circuit for balancing a plurality of serially-connected unit cells, comprising:
a balancing unit for every adjacent pair of unit cells among the plurality of serially-connected unit cells, the balancing unit comprising:
a discharge unit for discharging only a unit cell having a higher voltage among the adjacent pair of unit cells; and
a voltage-dividing unit for inputting voltages of the adjacent pair of unit cells to provide an enable signal to the discharge unit,
wherein
the discharge unit comprises two or more switching units connected in parallel, and
each of the switching units comprises two switching elements connected in series and configured to receive the enable signal, a node between the two switching elements being electrically connected to a node between the adjacent pair of unit cells.

2. The circuit as claimed in claim 1, wherein the enable signal comprises an average voltage of the adjacent pair of unit cells.

3. The circuit as claimed in claim 1, wherein
the discharge unit and the voltage-dividing unit are connected in parallel;
the voltage-dividing unit comprises two serially-connected resistors having a same resistance value; and
the discharge unit is connected to a node between the two serially-connected resistors.

4. The circuit as claimed in claim 1, wherein the two switching elements comprise a P-channel field effect transistor (FET) and an N-channel FET.

5. The circuit as claimed in claim 4, wherein
sources of the two switching elements are connected to each other;
a drain of the P-channel FET is connected to a negative electrode of the adjacent pair of unit cells; and
a drain of the N-channel FET is connected to a positive electrode of the adjacent pair of unit cells.

6. The circuit as claimed in claim 4, wherein a gate of the P-channel FET and a gate of the N-channel FET are configured to receive the enable signal.

7. The circuit as claimed in claim 1, wherein the balancing unit further comprises
a first power-consuming resistor electrically connected to an end of the discharge unit electrically connected to a positive electrode of the adjacent pair of unit cells, and
a second power-consuming resistor electrically connected to another end of the discharge unit electrically connected to a negative electrode of the adjacent pair of unit cells.

8. A secondary battery comprising:
a cell module comprising a plurality of serially-connected unit cells; and
a cell balancing circuit comprising a balancing unit for every adjacent pair of unit cells among the serially-connected unit cells, the balancing unit comprising:
a discharge unit for discharging only a unit cell having a higher voltage among the adjacent pair of unit cells;
a voltage-dividing unit for inputting voltages of the adjacent pair of unit cells to provide an enable signal to the discharge unit;
a first power-consuming resistor electrically connected to an end of the discharge unit electrically connected to a positive electrode of the adjacent pair of unit cells; and
a second power-consuming resistor electrically connected to another end of the discharge unit electrically connected to a negative electrode of the adjacent pair of unit cells.

9. The secondary battery as claimed in claim 8, wherein the enable signal comprises an average voltage of the adjacent pair of unit cells.

10. The secondary battery as claimed in claim 8, wherein
the discharge unit and the voltage-dividing unit are connected in parallel;
the voltage-dividing unit comprises two serially-connected resistors having a same resistance value; and
the discharge unit is connected to a node between the two serially-connected resistors.

11. The secondary battery as claimed in claim 8, wherein
the discharge unit comprises a switching unit comprising two switching elements connected in series and configured to receive the enable signal, and
a node between the two switching elements is electrically connected to a node between the adjacent pair of unit cells.

12. The secondary battery as claimed in claim 11, wherein the two switching elements comprise a P-channel field effect transistor (FET) and an N-channel FET.

13. The secondary battery as claimed in claim 12, wherein
sources of the two switching elements are connected to each other;
a drain of the P-channel FET is connected to a negative electrode of the adjacent pair of unit cells; and
a drain of the N-channel FET is connected to a positive electrode of the adjacent pair of unit cells.

14. The secondary battery as claimed in claim 12, wherein a gate of the P-channel FET and a gate of the N-channel FET are configured to receive the enable signal.

15. The secondary battery as claimed in claim 11, wherein the switching unit comprises two or more switching units connected in parallel.

16. The circuit as claimed in claim 1, wherein the node between the two switching elements and the node between the adjacent pair of unit cells forms a discharge path for discharging the unit cell having the higher voltage.

17. The secondary battery as claimed in claim 11, wherein the node between the two switching elements and the node between the adjacent pair of unit cells forms a discharge path for discharging the unit cell having the higher voltage.

* * * * *